(12) United States Patent
Stenzel et al.

(10) Patent No.: US 8,188,182 B2
(45) Date of Patent: May 29, 2012

(54) ION-CONDUCTIVE THERMOPLASTIC COMPOSITIONS FOR ELECTROCHROMIC GLAZING

(75) Inventors: Holger Stenzel, Hennef (DE);
Alexander Kraft, Berlin (DE);
Karl-Heinz Heckner, Berlin (DE);
Matthias Rottmann, Berlin (DE);
Bernd Papenfuhs, Obertshausen (DE);
Martin Steuer, Liederbach (DE)

(73) Assignee: Dritte Patentportfolio Beteiligungsgesellschaft mbH & Co. KG, Schoenefeld/Ot Waltersdorf (DE)

( * ) Notice: Subject to any disclaimer, the term of this patent is extended or adjusted under 35 U.S.C. 154(b) by 1298 days.

(21) Appl. No.: 10/560,902

(22) PCT Filed: Jun. 17, 2004

(86) PCT No.: PCT/EP2004/051141
§ 371 (c)(1),
(2), (4) Date: Apr. 5, 2006

(87) PCT Pub. No.: WO2004/112054
PCT Pub. Date: Dec. 23, 2004

(65) Prior Publication Data
US 2006/0159610 A1  Jul. 20, 2006

(30) Foreign Application Priority Data
Jun. 17, 2003  (DE) .................................. 103 27 517

(51) Int. Cl.
*C08G 18/08* (2006.01)
*C08G 63/48* (2006.01)
*C08G 63/91* (2006.01)
*C08K 3/00* (2006.01)
*C08F 8/00* (2006.01)

(52) U.S. Cl. ......................................... 524/779; 525/61
(58) Field of Classification Search .................... 525/61; 524/779
See application file for complete search history.

(56) References Cited

U.S. PATENT DOCUMENTS

| | | | | |
|---|---|---|---|---|
| 3,468,749 A * | 9/1969 | Elton et al. | ..................... | 428/215 |
| 4,128,694 A * | 12/1978 | Fabel et al. | ..................... | 428/412 |
| 4,210,564 A * | 7/1980 | Pouchol | ....................... | 524/557 |
| 4,397,969 A * | 8/1983 | Pouchol | ....................... | 523/310 |
| 4,499,236 A * | 2/1985 | Hermann et al. | ............... | 525/58 |
| 4,968,745 A * | 11/1990 | Misra et al. | ..................... | 525/61 |
| 4,999,253 A * | 3/1991 | Misra et al. | ..................... | 428/515 |
| 5,030,688 A * | 7/1991 | Misra et al. | ..................... | 525/61 |
| 5,424,150 A * | 6/1995 | Ohnishi et al. | ............... | 429/312 |
| 5,434,207 A * | 7/1995 | Fischer | ......................... | 524/270 |
| 5,670,574 A * | 9/1997 | Hill | ................................ | 525/61 |
| 5,838,483 A * | 11/1998 | Teowee et al. | ............... | 359/265 |
| 5,939,489 A * | 8/1999 | Muller | ............................ | 525/61 |
| 6,087,426 A | 7/2000 | Helms et al. | | |
| 6,555,594 B1 * | 4/2003 | Fukushima et al. | ............ | 522/81 |
| 6,992,130 B2 * | 1/2006 | Kusudou et al. | ............. | 524/503 |
| 7,312,275 B2 * | 12/2007 | Papenfuhs et al. | ............. | 525/61 |
| 7,358,304 B2 * | 4/2008 | Papenfuhs et al. | ............. | 525/61 |
| 2005/0079363 A1 * | 4/2005 | Hoss et al. | ..................... | 428/437 |
| 2005/0239960 A1 * | 10/2005 | Papenfuhs et al. | ............. | 525/61 |
| 2006/0052533 A1 * | 3/2006 | Papenfuhs et al. | ............. | 525/61 |
| 2006/0205871 A1 * | 9/2006 | Papenfuhs et al. | ............. | 525/61 |
| 2007/0231544 A1 * | 10/2007 | Stenzel | ........................ | 428/141 |
| 2007/0231550 A1 * | 10/2007 | Stenzel | ........................ | 428/172 |

FOREIGN PATENT DOCUMENTS

| | | |
|---|---|---|
| EP | 0 657 897 | 6/1995 |
| EP | 1 227 362 | 7/2002 |
| WO | WO 0240578 A1 * | 5/2002 |
| WO | WO03020776 A1 * | 3/2003 |

OTHER PUBLICATIONS

Machine Translation of WO 0240578 2009.*
International Search Report No. PCT/EP2004/051141, dated Oct. 18, 2004—2 pages.

* cited by examiner

*Primary Examiner* — Liam Heincer
(74) *Attorney, Agent, or Firm* — Panitch Schwarze Belisario & Nadel LLP

(57) ABSTRACT

The invention relates to ion-conductive thermoplastic compositions consisting of a partially acetalated polyvinyl alcohol, at least one support electrolyte and at least one softener, the partially acetalated polyvinyl alcohol containing two different acetal units. The invention also relates to electrochromic laminated glass systems produced using the ion-conductive compositions and to a method for producing said systems.

5 Claims, 1 Drawing Sheet

ION-CONDUCTIVE THERMOPLASTIC COMPOSITIONS FOR ELECTROCHROMIC GLAZING

The invention relates to an ion-conductive, thermoplastic composition consisting of a partially acetalated polyvinyl alcohol, at least one support electrolyte and at least one plasticiser and to the use, in electrochromic composite glazing, of thin foils produced therefrom.

FIELD OF TECHNOLOGY

Composite glazing the transparency and/or colour of which can be modified by applying an electric voltage, are referred to in the literature as electrochromic glazing. Typically, electrochromic glazing according to FIG. 1 is built up as follows: glass pane (a)—transparent electrically conductive layer (b)—electrochromic layer (c)—solid electrolyte (d)—redoxable ion storage layer or electrochromic layer (e) complementary to (c)—transparent electrically conductive layer f)—glass pane (g).

Layers c) and e) are separated from each other by a solid electrolyte (d). When applying a voltage to the electrodes b) and f), layers c) and e) are oxidised and/or reduced electrochemically as a result of which their colour and translucence is modified in the case where the layer c) and/or e) are electrochromic layers. The oxidation and reduction of layers c) and e) is accompanied by an exchange of ions with the solid electrolyte d). Consequently, this must have a sufficiently high ion concentration. Moreover, a correspondingly high ion conductivity of the solid electrolyte is required for a rapid switching operation.

A solid electrolyte for electrochromic glazing must also exhibit chemical and electrochemical stability as well as optical transparency, apart from a sufficiently high ion conductivity.

Many different materials have already been proposed for the production of solid electrolytes for electrochromic glazing.

STATE OF THE ART

In EP 1 056 097, homopolymers or copolymers of acrylic, methacrylic or styrene compounds in combination with plasticisers and supporting electrolytes and with particles of an inorganic or polymeric filler are disclosed for the production of a solid electrolyte.

U.S. Pat. No. 5,244,557, EP 392 839, EP 461 685 and EP 499 115 describe solid electrolytes based on polyethylene oxide.

In commercial composite glazing without electrochromic properties, intermediate foils of polyvinyl butyral (PVB), i.e. a partially acetalated polyvinyl alcohol, are frequently used. Polyvinyl butyral foils have the advantage of exhibiting a high transparency and provide the glass laminates made therefrom with a good mechanical strength.

The use of polyvinyl butyral foils in electrochromic composite glazing is consequently also known and disclosed e.g. in EP 1 227 362 and EP 0 657 897. The ion-conductive polyvinyl butyral foils proposed in these applications are produced from conventional PVB resin, plasticisers and support electrolytes as well as, if necessary, further additives. In order to guarantee a sufficiently high ion conductivity, however, a higher plasticiser content is required in this case than in conventional, non-ion-conductive PVB foils. A higher plasticiser content negatively influences the mechanical properties of the foil. Polyvinyl butyral foils in electrochromic glazing consequently possess either an insufficiently high ion conductivity with a good mechanical stability or—in the case of an increased plasticiser content—an improved ion conductivity with a reduced mechanical stability.

OBJECT

It has been the object of the present invention to modify the mixtures, based on partially acetalated polyvinyl alcohols which are frequently used in composite glazing, in such a way that a satisfactory long-term stability, a good ion conductivity and a satisfactory switching behaviour of electrochromic glazing produced therefrom, with sufficiently high mechanical properties is the result.

Partially acetalated polyvinyl alcohols, in particular polyvinyl butyral in this case, are produced on an industrial scale by suponifying polyvinyl acetate and subsequently acetylating it with an aldehyde(butanal). In this way, ternary polymers are formed which, as a rule, exhibit residual acetate contents of up to 5% by weight, polyvinyl alcohol contents of 15 to 30% by weight and a degree acetalation of 40 to 80%.

PRESENTATION OF THE INVENTION

Surprisingly enough, it has been found that mixtures of at least one support electrolyte, at least one plasticiser and one acid-functionalised partially acetalated polyvinyl alcohol exhibit an increased ion conductivity and, in electrochromic glazing produced therefrom, an improved switching behaviour and an improved long-term stability.

The object of the invention consequently consists of an ion-conductive thermoplastic composition containing a partially acetalated polyvinyl alcohol, at least one support electrolyte and at least one plasticiser, the partially acetalated polyvinyl alcohol being a co-polymer containing the monomer units vinyl acetate vinyl alcohol acetal I from vinyl alcohol and at least one aldehyde with formula I $$R^1\text{—CHO} \qquad \qquad I$$

with $R^1$: branched or unbranched alkyl radical with 1 to 10 carbon atoms acetal II from vinyl alcohol and a carbonyl compound with the formula II

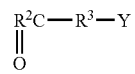

$$\underset{\underset{O}{\|}}{R^2C}\text{—}R^3\text{—}Y \qquad \qquad II$$

with $R^2$=H, branched or unbranched alkyl radical with 1 to 10 carbon atoms, $R^3$=direct compound, branched or unbranched alkyl radical with 1 to 10 carbon atoms, aryl radical with 6 to 18 carbon atoms and Y=—$CO_2H$, —$SO_3H$, —$PO_3H_2$.

The compositions according to the invention preferably contain:

50 to 90% by weight, in particular 50-70% by weight, of the partially acetalated polyvinyl alcohol described above 10 to 50% by weight, in particular 20 to 40% by weight of at least one plasticiser and 0.1 to 25% by weight, in particular 2-10% by weight, of at least one support electrolyte.

The partially acetalated polyvinyl alcohol used in the present invention contains at least two different acetal units I and II the acetal unit II of which is preferably obtained from vinyl alcohol and/or vinyl alcohol units of polyvinyl alcohol and an acid-functionalised aldehyde. Glyoxylic acid (here, $R^3$ represents a direct compound between the acid function Y and the carbonyl carbon atom), in particular, or pyruvic acid can be used as acid-functionalised aldehyde.

The acetals I are preferably produced as extremely pure substance or isomer mixture in each case by reacting vinyl alcohol and/or vinyl alcohol units of polyvinyl alcohol with at least one aldehyde from the group of formaldehyde, acetaldehyde, propanal, n-butanal(butylaldehyde), isobutanal, pentanal, hexanal, heptanal, octanal and/or nonanal. n-Butanal is used particularly preferably which is also used in the production of commercial polyvinyl butyral.

The numeric ratio of the polymer units of the partially acetalated polyvinyl alcohol from acetal I and acetal II can be adjusted within wide ranges and is preferably 1:1 to 10,0000:1, in particular 10:1 to 1000:1 or 100:1 to 1000:1.

The production of the partially acetalated polyvinyl alcohol can take place in a manner analogous to that of commercial polyvinyl butyral, a co-acetalation of polyvinyl alcohol with at least two different aldehydes or carbonyl compounds taking place to give the acetal groups I and II. Alternatively, an additional acetalation of polyvinyl butyral already produced can take place according to DE 10 143 190.

Moreover, it is possible to use a mixture of several partially acetalated polyvinyl alcohols, e.g. with commercial PVB.

It should be pointed out that the functionalised acetal units II are capable of reacting, with crosslinking, with the vinyl alcohol units still present in the partially acetalated polyvinyl alcohol. The crosslinking reaction is dependent, among other things, from the thermal treatment of the material during foil production and can consequently lead to very different degrees of crosslinking.

Compositions according to the invention preferably contain a partially acetalated polyvinyl alcohol with the repeating units 0.01 to 5% by weight of vinyl acetate
10 to 40% by weight, preferably 15 to 35% by weight, of vinyl alcohol and
40 to 80% by weight, preferably 45 to 75% by weight, of acetals I and II.

Salts with cations such as $Li^+$, $K^+$, $Na^+$, $Cs^+$, $Rb^+$, $NH_4^+$, $Mg^{2+}$, $Sr^{2+}$, $Ca^{2+}$, $La^{3+}$ and/or $Zn^{2+}$ and anions from the group of $PF_6^-$, $SbF_6^-$, $AsF_6^-$, $F^-$, $Cl^-$, $Br^-$, $CF_3SO_3^-$, $ClO_4^-$, $ClO_3^-$, $BF_4^-$, $N(SO_2CF_3)_2^-$, $CF_3CO_2^-$, $B_4O_7^{2-}$, pentaborate, oxalate, bisoxalatoborate $(C_4BO_8-)$ $AlCl_4^-$ and/or anions of organic sulphonic acids can be used as support electrolyte.

Preferred support electrolytes are $LiClO_4$, $LiPF_6$, $LiSbF_6$, $LiAsF_6$, $Li(CF_3COO)$, $LiBF_4$, $LiCF_3SO_3$, $Li_2C_2O_4$, $LiN(SO_2CF_3)_2$ or lithium bisoxalatoborate $(LiC_4BO_8)$.

Preferably, compounds with the formula III $$R^4-(OCH_2CH_2)_n-OR^5 \qquad III$$

are used as plasticiser or plasticiser component for the compositions according to the invention, $R^4$, $R^5$ representing identical or different, branched or unbranched, cyclic or acyclic, aliphatic and/or aromatic hydrocarbon radicals with 1 to 15 carbon atoms or H and n representing an integer between 1 and 5.

Additionally, all plasticisers can be employed which are usually used with polyvinyl butyral. These include esters of multivalent aliphatic or aromatic acids, multivalent aliphatic or aromatic alcohols or oligoether glycols with 1 to 10, preferably 1 to 4, ether units with one or several unbranched or branched aliphatic or aromatic substituents such as e.g., dialkyl adipate, dialkyl sebacate, esters of diglycol, triglycol or tetraglycol with linear or branched aliphatic carboxylic acids.

Particularly suitable are triethylene glycol dimethyl ether or tetraethylene glycol dimethyl ether, in particular in combination wit triethylene glycol-di-2-ethyl hexanoate (3G8), triethylene glycol-di-n-heptanoate(3G7) and/or glycol esters of benzoic acid.

The components of the compositions according to the invention can be mixed in commercial kneaders, mixers or extruders. In particular, it is possible to use the extrusion lines employed for processing polyvinyl butyrals to foils. For further processing of the compositions, foil thicknesses analogue to the polyvinyl butyral foils usually used (0.38, 0.76, 1.14 and 1.5 mm) have proved suitable.

A process for the production of ion-conductive foils is also the object of the invention, a mixture of the partially acetalated polyvinyl alcohols described above with at least one plasticiser and at least one supporting electrolyte, in the above-mentioned proportions and with preferred embodiments, being extruded to form a foil.

In order to obtain a roughened foil, the extrusion process according to the invention can be carried out under melt fracture conditions such as described e.g. in EP 0 185 863.

Alternatively, embossing of a non-roughened foil with corresponding rollers or belts can take place to give a one-sided or double-sided roughness of 40-120 μm.

Preferably, the surface structure is applied by the extrusion process directly before the discharge of the polymer melt from the extrusion die by means of the above-mentioned melt fracture process corresponding to EP 0 185 863 B1, the content of which is expressly referred to herewith. Different roughness levels can be produced in a controlled manner by varying the die gap width and with the die lip temperatures directly at the die exit. This process leads to an irregular (stochastic) approximately isotropic roughness (random roughness). This means that the measured value of the roughness, measured over all directions, is approximately the same but the individual elevations and troughs are arranged in a irregular manner as regards their height and distribution.

Measuring of the surface roughness of the foil, i.e. the roughness value 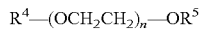, is carried out according to DIN 4768 or DIN EN ISO 4287 and DIN ISO 4288. The measuring devices used for measuring the surface roughness need to satisfy EN ISO 3274. The profile filters used need to correspond to DIN EN ISO 11562.

Moreover, the object of the invention consists of an electrochromic composite system built up of two electrode-coated bodies at least one of which is transparent and at least one exhibits an electrochromic film, the bodies coated with electrodes being separated by a foil consisting of the ion-conductive thermoplastic composition according to the invention.

To produce the composite glass systems according to the invention, two transparent bodies, in particular (a and g in FIG. 1), particularly preferably two glass panes, are coated with conductive transparent layers (b and f in FIG. 1) as electrodes.

Preferably, indium-doped tin oxide (ITO), aluminium-doped zinc oxide, fluorine-doped or antimony-doped tin dioxide (FTO or ATO) is used as transparent electrode material.

Onto at least one of these electrodes (b in FIG. 1), an electrochromic film (c) is applied which modifies the colour and/or transparency in the case of anodic oxidation or cathodic reduction. Metal polycyanometalates such as iron hexacyanoferrate, transition metal oxides such as tungsten trioxide or conductive polymers such as polyaniline, polythiophene or their derivatives are used for this purpose.

A redoxable ion storage layer or, preferably, an electrochromic layer (e) complementary to (c) is applied onto the other electrode (f).

Preferably, the electrochromic composite glass systems according to the invention contain, as electrochromic coatings, iron hexacyanoferrate (also referred to as Prussian blue, c in FIG. 1) and tungsten trioxide (e in FIG. 1).

The following examples are to illustrate the invention in further detail though not to restrict the area of protection as defined in the claims.

EXAMPLES

1. Comparative Example

Figure 1:
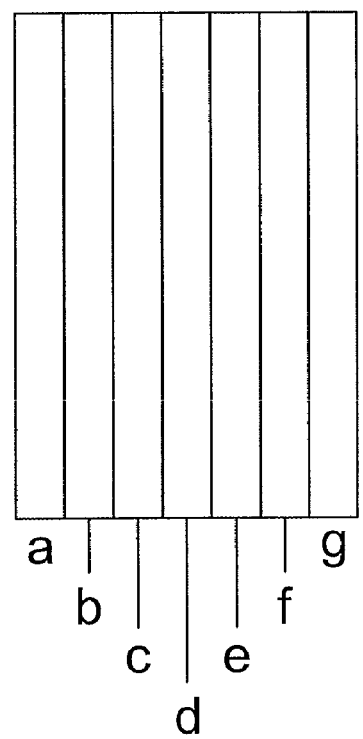
FIG. 1 shows a typical electrochromic glazing built up as follows: a glass pane (a), transparent electrically conductive layer (b), electrochromic layer (c), solid electrolyte (d), redoxable ion storage layer or electrochromic layer (e), complementary to (c), transparent electrically conductive layer (f), and a glass pane (g).

Ion-Conductive PVB Foil and Electrochromic Element Produced Therefrom According to the State of the Art An ion-conductive PVB foil with the composition:
65% by weight of PVB with a polyvinyl butyral content of 77.5% by weight, a PVOH content of 20.5% and a polyvinyl acetate content of 2% and
35% by weight of the plasticiser tetraethylene glycol dimethyl ether containing lithium trifluoromethane sulphonate as support electrolyte (7.33% by weight) as well as the UV absorber Tinuvin 571 (0.15 mass was extruded on a twin screw extruder with co-rotating screws (manufacturer: Leistritz, type LSM 30.34) equipped with a melting pump and slit die at a temperature of the mixture of 160° C.

Using this foil, an electrochromic element was produced. For this purpose, a K-glass pane (FTO-coated float glass) was coated electrochemically with tungsten trioxide and a second K-glass pane with Prussian blue. These two panes equipped with the above-mentioned electrochromic films were laminated together with the ion-conductive PVB foil described above (previously conditioned at 23° C. and 50% relative atmospheric humidity) according to the state of the art using a standard autoclave process for composite safety glass. The active switchable surface of this element amounted to 7.5 cm×18.5 cm (213.75 cm$^2$). After lamination, contacting and sealing of the electrochromic element with an epoxy resin took place. The ion conductivity of the foil in the finished element was determined from the impendance at 40 kHz. A value of $3.3 \cdot 10^{-6}$ S/cm was obtained.

2. Practical Example

Ion-Conductive PVB Foil According to the Invention

An ion-conduction PVB foil with the composition:
65% by weight of PVB with a PVOH content of 20.2%, a polyvinyl acetate content of 1.8%, a content of acetal of glyoxylic acid of 0.5% and a polyvinyl butyral content of 77.5% and
35% by weight of the plasticiser tetraethylene glycol dimethyl ether containing lithium trifluoromethane sulphonate as support electrolyte (7.33% by weight) and the UV absorber Tinuvin 571 (0.15% by weight) was produced as described in example 1.

Using this foil, an electrochromic element was produced as described in example 1. The active switchable surface of this element was 9 cm×30 cm (270 cm$^2$). After lamination, contacting and sealing of the electrochromic element, as described in example 1, took place. The ion conductivity of the foil in the finished element was determined from the impendance at 40 kHz. A value of $6.9 \cdot 10^{-6}$ S/cm was determined.

The incorporation of the glyoxylic acid group into the polymer chain of the PVB consequently leads to an increase in the ion conductivity by a factor of 2 with an otherwise identical foil composition.

3. Comparison of the Electrical Switching Characteristics of Electrochromic Elements According to Practical Examples 1 and 2

The electrical switching characteristics on 1.4V direct current switching was recorded of electrochromic elements of size 10 cm×30 cm which had been produced with an ion-conductive foil with a conductivity of $3.3 \cdot 10^{-6}$ S/cm (comparative example 1) or $6.9 \cdot 10^{-6}$ S/cm (practical example 2). In this case, the pane coated with tungsten trioxide is poled negatively and the pane coated with Prussian blue is poled positively. On decolourising, a direct voltage of reverse polarity was applied.

Figure 2:
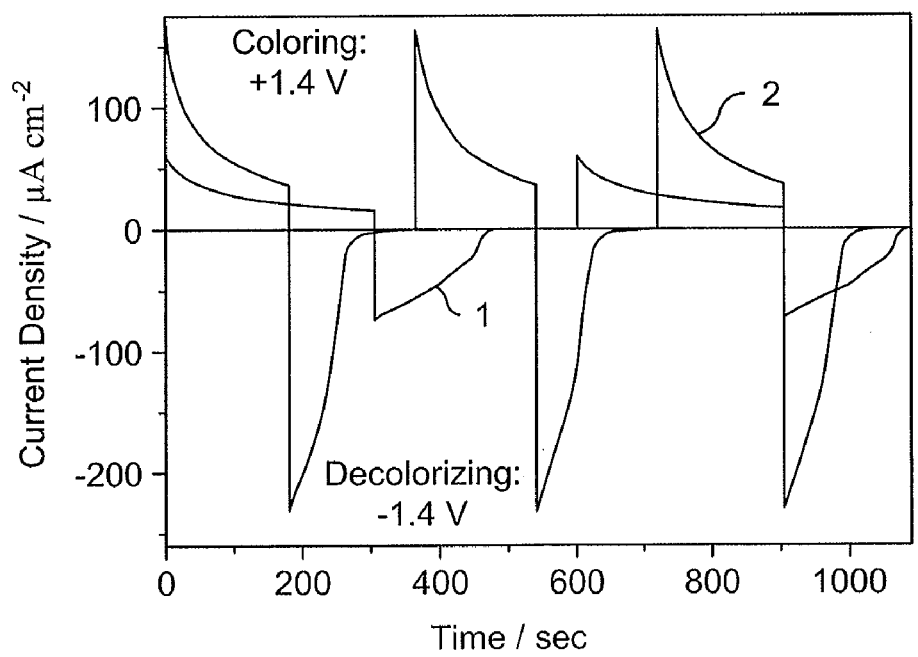
FIG. 2 shows current density-time curves of both elements as a comparison. 1 indicates the current density-time characteristic line of an element according to the state of the art and 2 a polymer electrolyte according to the invention.

FIG. 2 shows current density-time curves of both elements as a comparison. 1 indicates the current density-time characteristic line of an element according to the state of the art and 2 a polymer electrolyte according to the invention. The higher rate of switching of the electrochromic element according to the invention is clearly recognisable by the much higher flowing streams both during colouring and decolourising. In the case of element 2, an electric charge of 12.48 mC/cm$^2$ flows within 3 minutes on colouring. In the case of element 1, only 5.87 mC/cm$^2$ flowed after 3 minutes on colouring and only 8 mC/cm$^2$ after 5 minutes. Since the depth of colouration is proportional to the charge that has flown, this practical examples shows that the electrochromic element according to the invention switches much more rapidly than 1 according to the state of the art.

4. Comparison of the Permanent Switching Stability of Electrochromic Elements According to Examples 1 and 2 Subject to Changing Temperatures Permanent switching tests under changing temperatures were carried out using the electrochromic elements of size 10 cm×10 cm which had been produced with an ion-conductive foil according to comparative example 1 or practical example 2, in order to investigate the long-term stability of the electrochromic elements. The panes were coloured with a temperature-dependent direct voltage and decolourised using the same temperature-dependent voltage of reverse polarity (poling as described in example 3).

The temperature-dependence of the voltage U is indicated by the following equation:

$$U = 2.05 V - 0.0145 V/K \cdot \Delta T$$

with U: voltage at the corresponding pane temperature T in V, ΔT: temperature difference T+20° C. in K.

The colouring and decolourising steps follow each other directly, the colouring and decolourising time being 3 min in each case such that 10 switching cycles per hour or 240 switching cycles per day were carried out.

The exposure to changing temperatures during switching was effected in a conditioning cabinet. A temperature cycle takes one day in each case. In the case of this temperature cycle, the temperature is maintained for 4 h at +30°, then raised from +30° to +80° within 4 h, then maintained at +80° for 4 h, subsequently reduced from +80° to −25° C. within 4 h, held at −25° for 4 h and finally raised from −25° C. to +30° C. within 4 h.

Before the beginning of the permanent switching test with exposure to changing temperatures, the switchable charge capacity of the samples was determined with a colouring and/or decolourising time of 3 min each and a voltage of 1.4 V at a pane temperature of approximately 20° C. This determination was repeated after 4, 11, 18, 32, 60 and 88 temperature cycles (=days). After 88 temperature cycles (corresponding to 21,120 colouring/decolourising cycles), the switchable charge capacity and consequently the optical contact travel of the specimen according to comparative example 1 amounted to only 26% of the initial capacity, had consequently dropped to approximately a quarter of the initial value. The switchable charge capacity of the sample according to practical example 2, however, still amounted to 69% of the original value. The electrochromic element according to the invention consequently exhibits a much higher long-term stability than an element according to the state of the art.

The invention claimed is:

1. An ion-conductive thermoplastic composition comprising:
   a partially acetalated polyvinyl alcohol,
   0.1 to 25% by weight of at least one support electrolyte, and at least one plasticizer,
   wherein the partially acetalated polyvinyl alcohol comprises a co-polymer containing:
   77.5% by weight polyvinyl butyral,
   20.2% by weight polyvinyl alcohol,
   1.8% by weight polyvinyl acetate, and
   0.5% by weight acetal of glyoxylic acid.

2. The ion-conductive thermoplastic composition according to claim 1, wherein the plasticizer comprises tetraethylene glycol dimethyl ether, and the support electrolyte comprises lithium trifluoromethane sulphonate.

3. The ion-conductive thermoplastic composition according to claim 2, wherein the composition comprises 65% by weight of the partially acetalated polyvinyl alcohol copolymer and 35% by weight of the plasticizer and support electrolyte, with 7.33% by weight being the support electrolyte.

4. The ion-conductive thermoplastic composition according to claim 1, further comprising a UV absorber.

5. The ion-conductive thermoplastic composition according to claim 1, wherein the composition is in the form of a foil.

* * * * *